S. N. TRUMP.
Toy Scroll-Sawing Machine.
No. 7,938. Reissued Nov. 6, 1877.
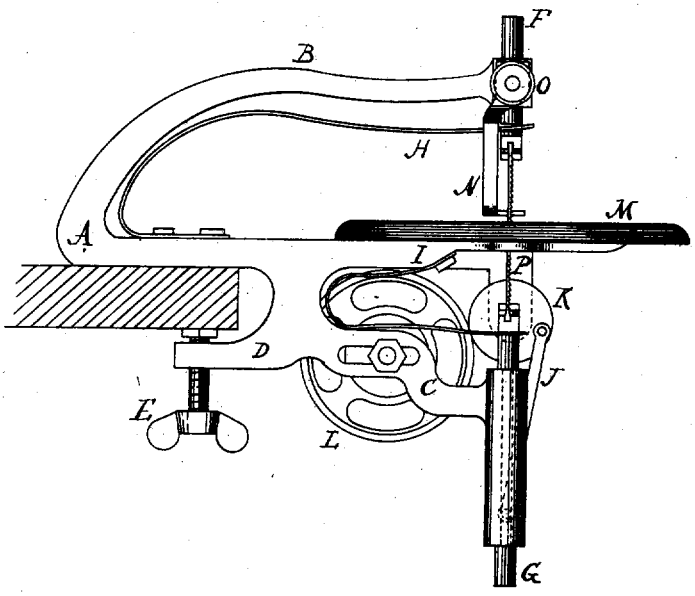
WITNESSES:
Chas. A. Trump
B. Wurzburger
Samuel N. Trump
INVENTOR
by
Geo. A. Sawyer,
ATTORNEY.
N. PETERS, PHOTO-LITHOGRAPHER, WASHINGTON, D. C.

UNITED STATES PATENT OFFICE.

SAMUEL N. TRUMP, OF WILMINGTON, DELAWARE.

IMPROVEMENT IN TOY SCROLL-SAWING MACHINES.

Specification forming part of Letters Patent No. 129,874, dated July 23, 1872; Reissue No. 7,938, dated November 6, 1877; application filed October 9, 1877.

*To all whom it may concern:*

Be it known that I, SAMUEL N. TRUMP, of Wilmington, in the county of New Castle and State of Delaware, have invented certain new and useful Improvements in Toy Scroll-Sawing Machines; and I do hereby declare that the following is a full, clear, and exact description thereof, that will enable others skilled in the art to which it appertains to make and use the same, reference being had to the accompanying drawings, and to the letters of reference marked thereon, which form a part of this specification.

This invention relates to toy sawing-machines of that class intended particularly for the use of workers in thin woods and metals.

My object is to furnish a light, portable, and yet cheap and efficient machine, which may be attached to any convenient table or other support, and be operated either by treadle or steam power, as may be convenient.

The drawing shows my device in side elevation.

A is the cast-metal frame of the machine, having the curved upper arm B, the lower arm C, and the projection D, forming a jaw by which the frame is attached to a stand or table, where it is held firmly by the set-screw E.

Through the end of the arm A, and on a projection of the lower arm C, are tubular guides for the spindles F and G, to which the ends of the saw-blades are attached.

A curved spring, H, one end of which is fastened to the frame of the machine, and the other end slotted to embrace the upper spindle F, serves to maintain a tension upon the saw, and this strain, which would otherwise cause an irregular motion, is compensated for by the lower spring I, one end of which is also fastened to the frame A, and the other slotted to receive the lower spindle G.

The lower arm C carries a pitman-pulley, K, and a friction drive-wheel, L. The pulley K is connected by the pitman J with the spindles holding the saw. The drive-wheel is rotated by a foot-treadle or other appropriate mechanism.

The frame A also carries a horizontal table, M, through the center of which the saw passes, and upon which the board or material to be operated on is placed.

The upper arm B also carries an adjustable metal foot, N, under which the lumber is placed when fed up to the saw. Its upper end is held to the arm by a set-screw, O, passing through a slot, which permits its adjustment to lumber of varying thickness.

The saw-blades may be held in the spindles either by a wedge-shaped cleft, which holds the taper end of the blade, or by any appropriate clamping device.

The operation of the machine is as follows: Motion is given to the wheels L and K, and, through the pitman, to the spindles carrying the saw-blade, which is thereby reciprocated in a vertical direction.

The material to be sawed is placed under the foot N, which is adjusted to the right height to permit its free movement, and prevent the saw-blade from jerking it from the table, whereby the material is liable to injury and the saw to fracture, and it is fed toward the saw by the hands, either in a straight or curved line, as may be desired.

I am aware that springs are used to produce a tension upon the saw-blades; but when one is used alone, and pulls in one direction only, it must produce an irregularity of motion, which, in this machine, is counteracted by a compensating-spring on the other spindle, bearing in the opposite direction, thereby equalizing the strain, and producing a uniformity of motion, adding greatly to the value and usefulness of the machine.

Having thus described my invention, what I claim as new, and desire to secure by Letters Patent, is—

1. A toy scroll-sawing machine having the cast-metal frame A, said frame having the curved upper arm B, carrying the spindle F, the projection D, forming the jaw through which passes the set-screw E, by which it is secured to a table having the lower arms C and P, which carry the spindle G, the pitman-pulley K, and the drive-wheel L, and having the circular table M attached thereto by screws, substantially as described.

2. In a toy scroll-sawing machine, the combination of the saw-blade, the tension-spring H, operating upon the upper spindle, and the compensating-spring I, operating upon the lower spindle, substantially as described.

In testimony that I claim the foregoing I have hereunto set my hand this 4th day of October, 1877.

SAML. N. TRUMP.

Witnesses:
D. T. BRADFORD,
E. B. MOORE.